Patented Sept. 9, 1952

2,610,183

UNITED STATES PATENT OFFICE 2,610,183

3-SUBSTITUTED DERIVATIVES OF 2,3-DIHYDROTHIANAPHTHENE-1-DIOXIDE

Wilbur H. McKellin and Frederick G. Bordwell, Evanston, Ill., assignors to The Texas Company, New York, N. Y., a corporation of Delaware No Drawing. Application September 26, 1949, Serial No. 117,938

4 Claims. (Cl. 260—247.1)

This invention relates to novel compounds derived from thianaphthene-1-dioxide. More specifically, the novel compounds of this invention are addition products of thianaphthene-1-dioxide and secondary amines.

The compounds of this invention may be described as derivatives of 2,3-dihydrothianaphthene-1-dioxide having a secondary amino group substituted in the 3-position. The novel compounds of this invention have the general formula:

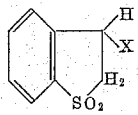

wherein X is a secondary amino group. The novel compounds of this invention include addition products of thianaphthene-1-dioxide with cyclic secondary amines, such as morpholine and piperidine. Addition products of thianaphthene-1-dioxide and aliphatic secondary amine, such as diethylamine, are the more common members of the novel addition products of this invention.

The novel compounds of this invention are crystalline solids which are useful as pesticides, pharmaceuticals and as chemical intermediates in the preparation of pesticides, pharmaceuticals and lube oil additives.

The addition products of thianaphthene-1-dioxide and secondary amines are very simply prepared. The two reactants, namely, thianaphthene-1-dioxide and secondary amine, are heated under reflux for a period of time; thereafter the adduct is isolated from the reaction mixture. The following examples illustrate the simple manner in which the novel compounds of this invention can be prepared. However, it will be understood that the novel compounds of this invention are in no way restricted to any one mode of preparation.

Example I 0.1 g. of thianaphthene-1-dioxide, 1.0 g. of piperidine and 15 cc. of 95 per cent alcohol were refluxed for 15 minutes. Thereafter, the alcohol was removed from the reaction mixture by a current of air. A quantitive yield of 3-piperidino-2-3-dihydrothianaphthene-1-dioxide was obtained; the crude product had a melting point of 103 to 110° C. On recrystallization from dilute alcohol a pure product was obtained having a melting point of 109 to 110° C. Analysis of this purified sample indicated that it contained 62.11 per cent carbon and 6.83 per cent hydrogen as compared with calculated theoretical values of 62.12 per cent and 6.82 per cent for the elements in the order named. 3-piperidino-2,3-dihydrothianaphthene-1-dioxide has the following structural formula:

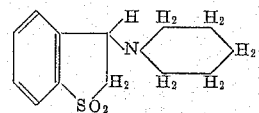

Example II 0.5 g. of thianaphthene-1-dioxide, 0.5 g. of morpholine and 20 cc. of water were refluxed 1½ hours. Upon cooling there was obtained a quantitive yield of 3-morpholino-2,3-dihydrothianaphthene-1-dioxide melting at 176 to 179° C. On recrystallization from alcohol a pure product was obtained melting at 177.5 to 178.5° C. Analysis of this product indicated that it contained 5.76 per cent nitrogen as compared with a calculated theoretical value of 5.53 per cent. 3-morpholino-2,3-dihydrothianaphthene-1-dioxide has the following structural formula:

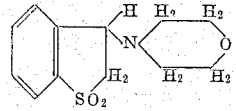

Example III 2.0 g. of thianaphthene-1-dioxide, 2.0 g. of diethylamine and 80 cc. of water were refluxed for one hour. On cooling, there was formed 2.6 g. of a precipitate melting at 95 to 97° C.; this comprised a 90 per cent yield of 3-diethylamino-2,3-dihydrothianaphthene-1-dioxide. On recrystallization from dilute alcohol, there was obtained a pure product melting at 97.5 to 98° C. Analysis of this product indicated that it contained 5.53 per cent nitrogen as compared with a calculated theoretical value of 5.85 per cent. 3-diethylamino-2,3-dihydrothianaphthene-1-dioxide has the following structural formula:

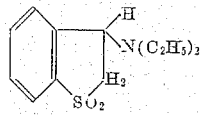

The foregoing examples illustrate a method of preparing the novel compounds of this invention. As indicated previously, other preparative procedures may be employed to prepare the novel compounds of this invention. Moreover, secondary amines other than those employed in the foregoing examples react with thianaphthene-1-dioxide to yield addition products which are members of the novel class of compounds of this invention.

Obviously, many modifications and variations of the invention, as hereinbefore set forth, may be made without departing from the spirit and scope thereof, and therefore, only such limitations should be imposed as are indicated in the appended claims.

We claim:
1. 2,3-dihydrothianaphthene-1-dioxide compounds having the general formula:

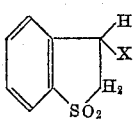

wherein X is a secondary amino group selected from the group consisting of dialkyl amino, piperidino and morpholino radicals.

2. 3 - piperidino - 2,3 - dihydrothianaphthene-1-dioxide.

3. 3 - morpholino - 2,3 - dihydrothianaphthene-1-dioxide.

4. 3 - diethylamino - 2,3 - dihydrothianaphthene-1-dioxide.

WILBUR H. McKELLIN.
FREDERICK G. BORDWELL.

REFERENCES CITED

The following references are of record in the file of this patent:

UNITED STATES PATENTS

| Number | Name | Date |
|---|---|---|
| 2,291,798 | Delfs | Aug. 4, 1942 |
| 2,430,821 | Morris et al. | Nov. 11, 1947 |
| 2,461,341 | Morris et al. | Feb. 8, 1949 |

OTHER REFERENCES

Bardwell et al., Jour. Amer. Chem. Soc., vol. 70 (1948), pages 1558–1560.